US008621065B1

(12) United States Patent
Saurel et al.

(10) Patent No.: US 8,621,065 B1
(45) Date of Patent: Dec. 31, 2013

(54) DYNAMIC BLOCKING OF SUSPICIOUS ELECTRONIC SUBMISSIONS

(75) Inventors: Pierre Saurel, Dublin (IE); Brian Dennehy, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 785 days.

(21) Appl. No.: 12/257,112

(22) Filed: Oct. 23, 2008

(51) Int. Cl.
*G06F 15/173* (2006.01)

(52) U.S. Cl.
USPC .............................. 709/224; 709/200; 726/23

(58) Field of Classification Search
USPC ..................................... 709/224, 200; 726/23
See application file for complete search history.

(56) References Cited

U.S. PATENT DOCUMENTS

| | | | |
|---|---|---|---|
| 6,327,622 B1 * | 12/2001 | Jindal et al. ................... | 709/228 |
| 7,549,162 B2 * | 6/2009 | Aaron ............................. | 726/12 |
| 7,607,170 B2 * | 10/2009 | Chesla ........................... | 726/22 |
| 7,698,458 B1 * | 4/2010 | Liu et al. ....................... | 709/238 |
| 2002/0166063 A1 * | 11/2002 | Lachman et al. ............. | 713/200 |
| 2004/0073812 A1 * | 4/2004 | Wesinger et al. ............. | 713/201 |
| 2005/0193429 A1 * | 9/2005 | Demopoulos et al. ........ | 726/23 |
| 2005/0262556 A1 * | 11/2005 | Waisman et al. .............. | 726/22 |
| 2008/0072326 A1 * | 3/2008 | Danford et al. ............... | 726/23 |
| 2009/0288165 A1 * | 11/2009 | Qiu et al. ....................... | 726/23 |

\* cited by examiner

*Primary Examiner* — Joseph Avellino
*Assistant Examiner* — James Conaway
(74) *Attorney, Agent, or Firm* — Kilpatrick, Townsend & Stockton, LLP

(57) ABSTRACT

Attacks from automated scripts or processes, such as Web bots, can be dynamically blocked by monitoring dimensions of requests or submissions received by a system. Each host receiving requests can log information about the requests over a specified period of time. For each period of time, specified dimensions of the requests for that host can be analyzed to determine whether the number of requests having a common value for any of those dimensions meets or exceeds a specified threshold. If so, any requests having those specified dimension values can be automatically blocked for the next specified period of time. The requests can be automatically unblocked after that period of time if the requests do not again meet or exceed the threshold, but can be dynamically blocked for subsequent periods of time if the threshold is again met or exceeded.

25 Claims, 5 Drawing Sheets

500

| Org | Fleet Size | Period | Threshold | | | Requests allowed per period | | | Average allowed requests/sec fleet | | |
|---|---|---|---|---|---|---|---|---|---|---|---|
| | | | IP | Customer | Session | IP | Customer | Session | IP | Customer | Session |
| US | 15 | 120 | 1.33 | 0.07 | 0.07 | 2400 | 120 | 120 | 20 | 1 | 1 |
| M1K | 15 | 120 | 1.33 | 0.07 | 0.07 | 2400 | 120 | 120 | 20 | 1 | 1 |
| UK | 8 | 120 | 2.5 | 0.13 | 0.13 | 2400 | 120 | 120 | 20 | 1 | 1 |
| DE | 7 | 120 | 2.86 | 0.14 | 0.14 | 2400 | 120 | 120 | 20 | 1 | 1 |
| JP | 6 | 120 | 3.33 | 0.17 | 0.17 | 2400 | 120 | 120 | 20 | 1 | 1 |
| CA | 6 | 120 | 3.33 | 0.17 | 0.17 | 2400 | 120 | 120 | 20 | 1 | 1 |
| TGTUS | 3 | 120 | 6.67 | 0.33 | 0.33 | 2400 | 120 | 240 | 20 | 1 | 1 |
| FR | 3 | 120 | 6.67 | 0.33 | 0.33 | 2400 | 120 | 120 | 20 | 1 | 1 |

FIG. 5

DYNAMIC BLOCKING OF SUSPICIOUS ELECTRONIC SUBMISSIONS

BACKGROUND

As the number of users performing actions such as viewing information and purchasing items electronically increases, there is also an increasing amount of forgery, misuse of identity information, and other such illicit activities in such an electronic environment. For example, many automated applications, processes, or scripts (referred to generically as robots or "bots") perform tasks such as submitting requests or initiating submissions across a network at a much higher rate than would generally be performed by a user of a system, application, or site attached to, or otherwise accessible through, the network. While certain bots can be used beneficially to execute certain functionality, other bots can be used maliciously to flood a server, host, application, network, device, or location with requests or other submissions that can cause the device or application to slow or even fail for a certain period of time.

Such attacks are particularly prevalent across the Internet. Many popular Web sites are subjected to bot attacks on a daily basis. These range from simple requests for Web pages at a rate that is higher than a Web server can handle, to more specific attacks that go deeper into a system, site, or application, for example, such as by using an overwhelming number of requests to perform a specific task, such as to add an item to a virtual shopping cart for an electronic marketplace. Many sites monitor traffic, and begin throttling or otherwise limiting the number of requests or other traffic when the amount of bandwidth reaches a certain level. Oftentimes, a system will log requests such that a manual decision can be made to block users or IP addresses where the traffic is determined to be excessive. These approaches generally work well for attacks that are not directed to specific functionality in the system, but are directed to a top layer of the system or software. Such approaches are not particularly well suited, however, to targeted or patterned attacks directed to potentially vulnerable portions of the systems, where a smaller number of requests in a shorter period of time can damage the system without necessarily reaching the levels used for throttling, setting off alarms, etc. Further, conventional approaches can be slow to react, which in the case of a bot attack can result in the attack being at least partially successful for a period of time.

BRIEF DESCRIPTION OF THE DRAWINGS

Various embodiments in accordance with the present disclosure will be described with reference to the drawings, in which:

FIG. 5 illustrates a table of threshold and other values that can be used to dynamically block requests having different parameter values that can be used in accordance with one embodiment.

DETAILED DESCRIPTION

Figure 1:
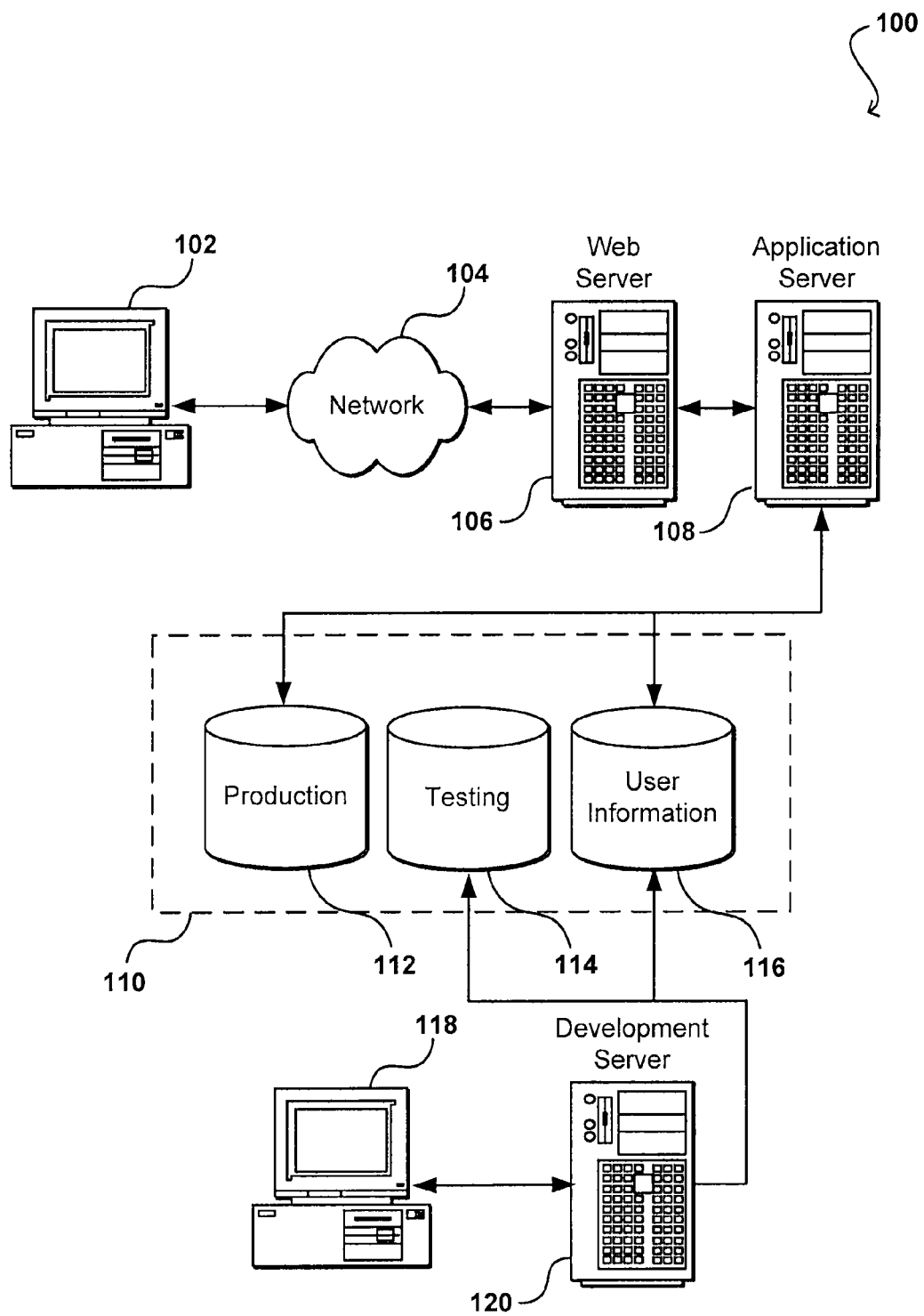
FIG. 1 illustrates an environment in which various embodiments can be implemented.

Systems and methods in accordance with various embodiments of the present disclosure may overcome one or more of the aforementioned and other deficiencies experienced in conventional approaches to detecting and blocking malicious attacks and similar types of excessive or directed traffic in an electronic environment. Systems and methods in accordance with various embodiments provide approaches for detecting traffic having at least one specified dimension that meets at least one specific threshold, and dynamically blocking traffic having that dimension for at least a specified period of time. In an Internet-based example, a Web bot attacking a Web site might submit several requests in a short period of time that all use the same session information or user information, or that all come from the same originating address or location. A request manager or other such process or device running for a particular host can monitor the incoming traffic over a period of time, such as by examining a request or query log for that host, and can determine which requests have the same value for the specified dimension, pertain to the same session, user, originating address, etc. If the number of requests having the same specified dimension(s) meets or exceeds a specified threshold, such as a rate or total number of requests over that period of time, the request manager can decide to automatically block such requests over at least a next period of time.

Such a system also can automatically unblock requests having the blocked dimension value after the specified period of time. In one embodiment, a specified monitoring period is configurable by a user and can be set to any appropriate value, such as for two minutes. For every monitoring period, a request manager or other such component monitors traffic and determines whether any requests should be temporarily blocked. If it is determined that requests having a certain dimension value (i.e., having the same session ID or user ID, or originating from the same IP (Internet Protocol) address) are to be blocked, then requests having that dimension will be blocked for the specified period of time. At the end of the monitoring period, requests having that dimension value will be unblocked and allowed to be processed by the respective host if the number of requests for having this dimension value is below the threshold during the period in which the requests are blocked. In various embodiments, information for each blocked request is still written to the query log so that the number of received requests over a monitoring period can be determined even if those requests are not processed. If the number of requests with the specified dimension value again meets or exceeds the threshold, the requests can again be blocked for the next specified period. This can involve unblocking all request dimension values at the end of each period, then adding every dimension value to a block list for the next monitoring period if the requests again exceed the threshold. In another embodiment, dimension values at the end of each period are only unblocked if requests with those dimension values do not meet or exceed the threshold for that period. Any dimension values where the number of requests again at least meets the threshold can remain on the block list.

If requests having a specified dimension value are blocked a certain number of times within a certain amount of time, such as five times in a one hour period, or for three consecutive monitoring periods, then an alarm or other notification can be generated to notify someone of potentially suspicious activity. An administrator or authorized other user then can determine whether or not to permanently blacklist requests having that dimension value. In some systems, the requests with that dimension value are blocked when the alarm is triggered, and will remain blocked until a user decides to unblock those requests. In still other systems, requests can be dynamically blacklisted based on dimensions such as those set forth above. In one embodiment, a script is run once per configurable period (e.g., a week) that will check the blockages for the previous week, to determine whether any should be considered for addition to a static blacklist. If any dimension values are identified, an electronic ticket or other action item can be generated with the information included to be approved by an authorized user before being blacklisted. As used herein, "blacklisted" requests are requests that are "never" allowed to be processed (at least as long as those requests are blacklisted). Thus, the "static" blacklist can change over time, but each item on the list is always blocked while on the blacklist.

While examples will be discussed generally with respect to Internet-based technologies, such as Web sites, client browsers, cookies, etc., it should be understood that advantages of the various embodiments can be obtained for any appropriate electronic environment wherein requests, messages, or other packets of electronic information are submitted from one address or location to another address or location, and it is possible for a person, device, or process to send such a packet of information in a way that makes it appear as if the packet came from a different source, user, etc.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 (such as corporate or customer data) and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
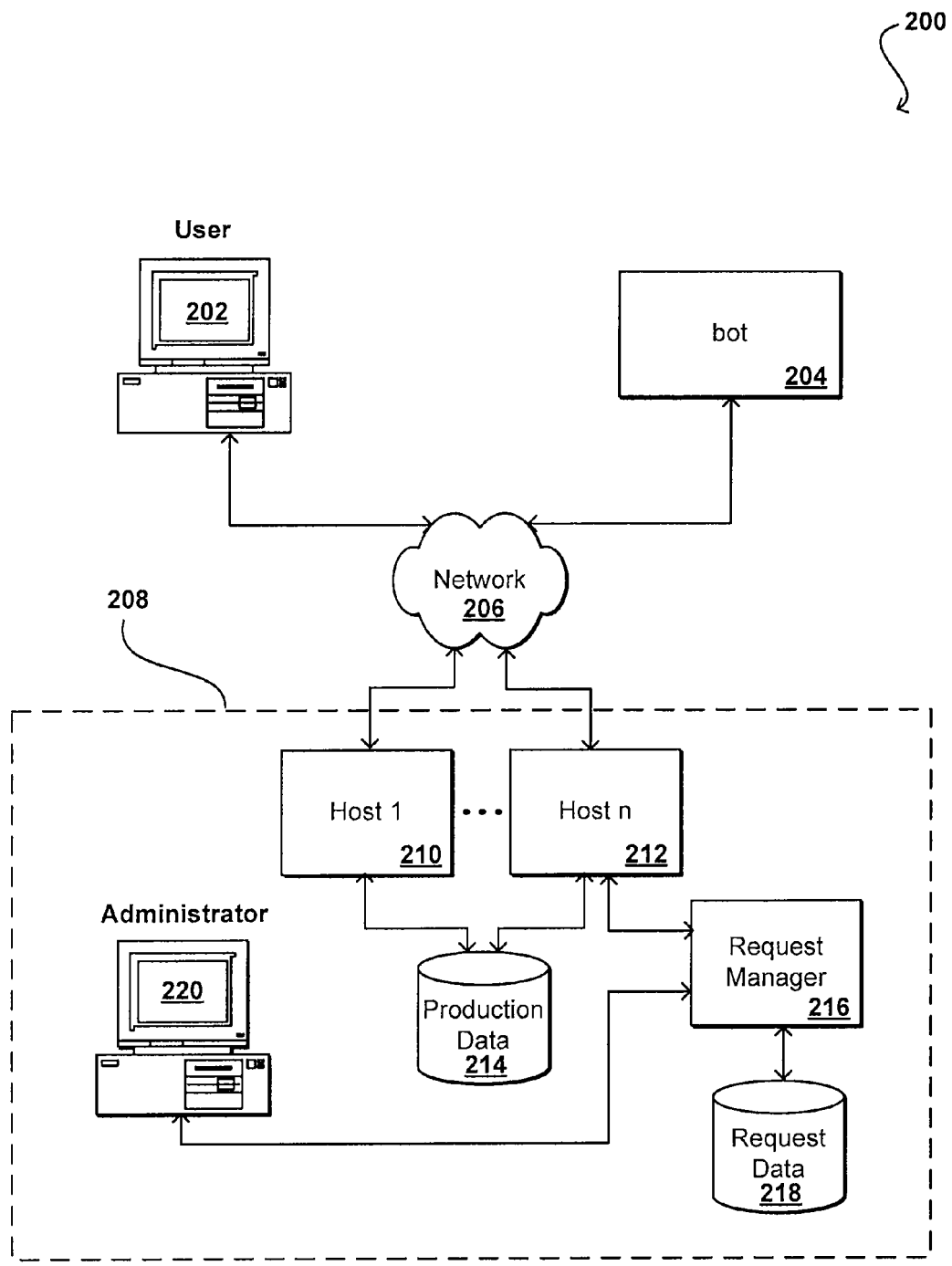
FIG. 2 illustrates components for analyzing aspects of requests received by each host that can be used in accordance with one embodiment.

An environment such as that illustrated in FIG. 1 can be useful for a provider of services or functionality across a network, wherein multiple users send requests or other such submissions across the network. The electronic environment in such a case might include additional components and/or other arrangements, such as those illustrated in the configuration 200 of FIG. 2. In this example, devices such as a user client device 202 are able to access an entity 208 across a network 206. The "entity" as it will be referred to herein can include any appropriate combination of devices, processes, and components for receiving requests or other electronic submissions across the network, and execute operations and/or serve responses in response thereto. The entity might provide a Web site, for example, or could in some embodiments include an enterprise application, a company's electronic presence, a database application, etc., as discussed elsewhere herein.

In this example, a user of a client device 202 might cause a request or other submission to be sent to the entity 208, which would be received by, or directed to, one of a number of host devices 210, 212. In this example, each host device can correspond to a Web server able to receive Internet-based requests from a user over the network. Each host device also can include functionality to execute application commands or other such processes, or can be in communication with at least one separate application server (as discussed with respect to FIG. 1). In this example, a request from a user can be directed to any appropriate host device 208 by the entity, such as by using a load manager or other distribution process or device. In other embodiments, requests might be generated to be directed to a specific host. As discussed elsewhere herein, requests from automated scripts or processes such as a Web bot 204 also can be received by the hosts over the network, and often will be indistinguishable from requests received from a user.

Each received request will have various aspects or dimensions associated therewith. For example, each request will have data and/or metadata specifying an originating address, source, or location, such as an originating IP address in an Internet-based system. An IP address will be generally referred to herein as the "value" for the originating IP address "dimension," and similar terms will be used for similar aspects. In some cases, the request will also have information identifying the user, the user device, a session upon which the request is received, etc. For example, a user might have a user or session identifier ("ID") generated when the user logs in to, or otherwise accesses or is authenticated to, a Web site, Web page, application, online game, etc. A user ID can be any appropriate alphanumeric identifier that is associated with a particular user, as may be stored in a data store and used to identify a user over time, or stored in local cache for temporary authentications. A session ID also can be any appropriate alphanumeric identifier, often a random number, which is used as an index into a data store that contains session and/or state information for a user. The session ID generally is used to identify a user and associate that user with previous actions, etc. In many cases, the session ID will be stored locally on a client device of the user, such as in a "cookie" for a browser on the client device. Generally, a "cookie" refers to a piece of text generated by a server and sent to a client application on a client device, which is stored locally on the client device and can be sent with any subsequent request from the client device back to that server, address, or other related location or device. Cookies can be used to store information such as user authentication information, session information, and user-specific information, such as personalization information, preference information, etc. Any of this and/or other information can be included in a request or submission in various embodiments.

If security were not an issue, a host receiving a request could simply process the request, such as by pulling data from a production data store 214, querying against an index, executing a Web service, or performing any other appropriate functionality in response to the request. In this embodiment, however, at least one dimension for each request is stored or kept in memory at least temporarily, and this information is passed to, and processed by, at least one request manager 216. While a request manager is shown in the figure as a separate component, it should be understood that there can be one request manager for each host, one request manager for all hosts, or any other appropriate number or configuration, and that each request manager can be a separate device or process, or can be a process running on a respective host device, etc. A request manager can analyze dimensions for various requests, and can determine whether to allow each request to be processed, or whether to prevent or "block" the request from being processed. The request manager 216 can access and store data to an appropriate request data store 218, or any other appropriate repository, and also can keep certain information in memory. For example, request dimension values that correspond to blacklisted requests, that are never processed, might be stored in a data repository and in resident memory, while request dimension values that are only temporarily blocked, as discussed herein, might only be cached or otherwise stored in local memory by a host or request manager. The request manager also can take advantage of a query or request log that stores information for each received request over a given monitoring period for a host. Dimensions to be analyzed, users to be blocked, periods of time over which to block requests, and various other aspects used by the request manager can be configurable, such as may be managed by an administrator using a computing device 220 in communication with the request manager, or an application or process controlling aspects of the request manager.

An approach in accordance with one embodiment takes advantage of information received with the request to dynamically block requests that exceed a particular volume or other threshold for specified dimensions over a given period of time. For example, one approach is to monitor a volume of requests having particular session IDs, which each generally characterize a user whether or not that user has been authenticated to the system. Another approach includes monitoring a volume of requests having a user ID, customer ID, or similar identifying information that is used to identify a user that has been authenticated to the system. Another approach is to monitor requests originating from the same location, such as from the same IP address, or any other originating information that can be obtained from a request. Various embodiments might monitor any or all of these dimensions, as well as any other appropriate dimensions obtainable for a received request as discussed or suggested elsewhere herein.

While various embodiments can track and store information over time to more accurately predict or detect malicious attacks, such approaches can be resource intensive and thus may not be desirable in all situations. Systems and methods in accordance with other embodiments use dynamic blocking and unblocking on a per-host basis for relatively short periods of time, or monitoring periods of configurable length, which can be effective in preventing most attacks while not significantly affecting the user experience for any genuine user that might inadvertently, unintentionally, or innocently exceed a threshold for one of the specified dimensions.

Figure 3:
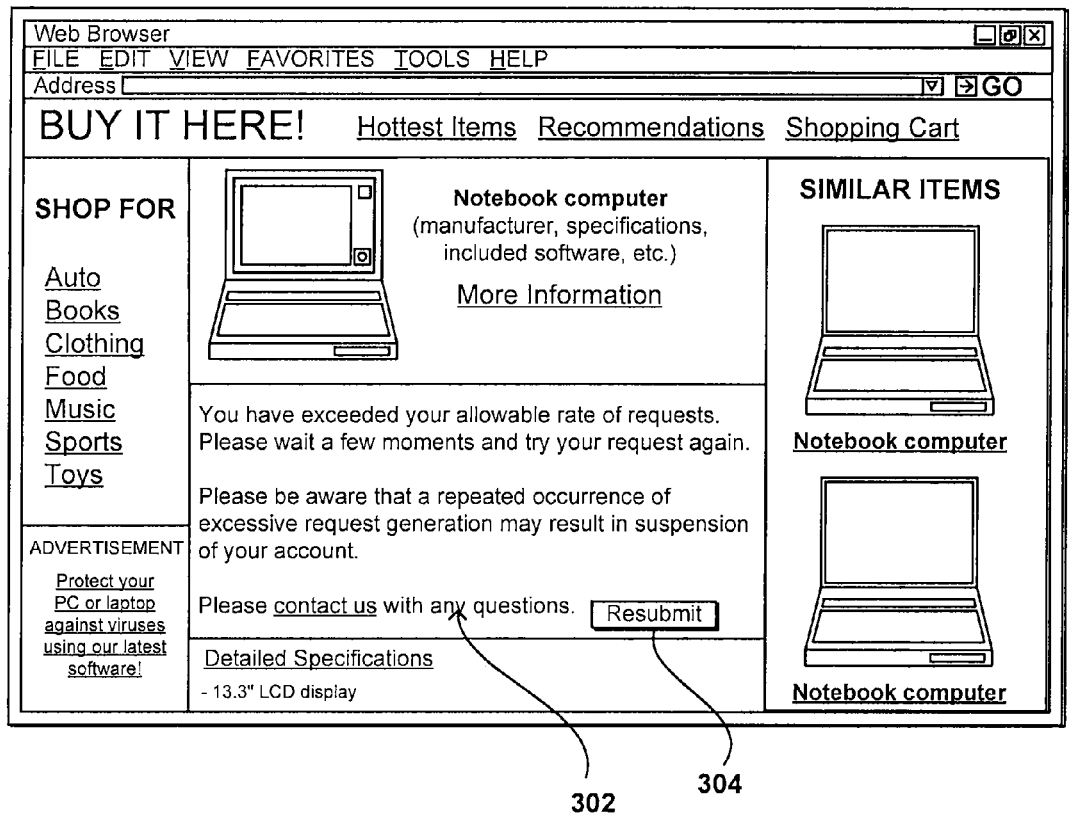
FIG. 3 illustrates an interface page that can be displayed to a user who is being temporarily blocked in accordance with one embodiment.

For example, an approach in accordance with one embodiment analyzes requests over two-minute monitoring periods. While any appropriate time period can be used, a two minute interval is used in at least one embodiment as the interval is sufficiently long to accumulate a reliable amount of data, but short enough to prevent damage from an attack where a bot or other such process attempts to flood a system, host, site, etc., with an excessive number of requests. A request manager can monitor at least one specified dimension for each request received over each two minute monitoring period. The manager can keep track of how many requests are received for a host over the monitoring period that have the same value for the specified dimension(s), such as having the same session ID. If the number of requests received over a monitoring period having the same value for one of the specified dimensions meets or exceeds a given threshold, then the request manager can decide to temporarily block requests having that dimension value for the next monitoring period. When the request manager decides to block requests having a specified dimension value, the request manager can cause a response to be sent back for each such blocked request, such as a page 300 to be displayed on the device generating the request as illustrated in the example of FIG. 3. In the example page 300, a message 302 is included indicating that a volume or other aspect related to the requests has been exceeded, or any other appropriate message. An option 304 also can be included to resubmit the request after a given period of time. In some embodiments, this option might not be available or selectable (e.g., may be grayed out) until the monitoring period for blocking the requests is over, while in other embodiments there may be a countdown clock or other appropriate indicator. By displaying such a page, a genuine user who accidentally exceeded the threshold can be given an appropriate explanation, and can adjust behavior accordingly. If the request was sent by an automated process, then the page will typically not be displayed, but the process will be unable to have requests received by the respective host during the time of the blocking.

Figure 4:
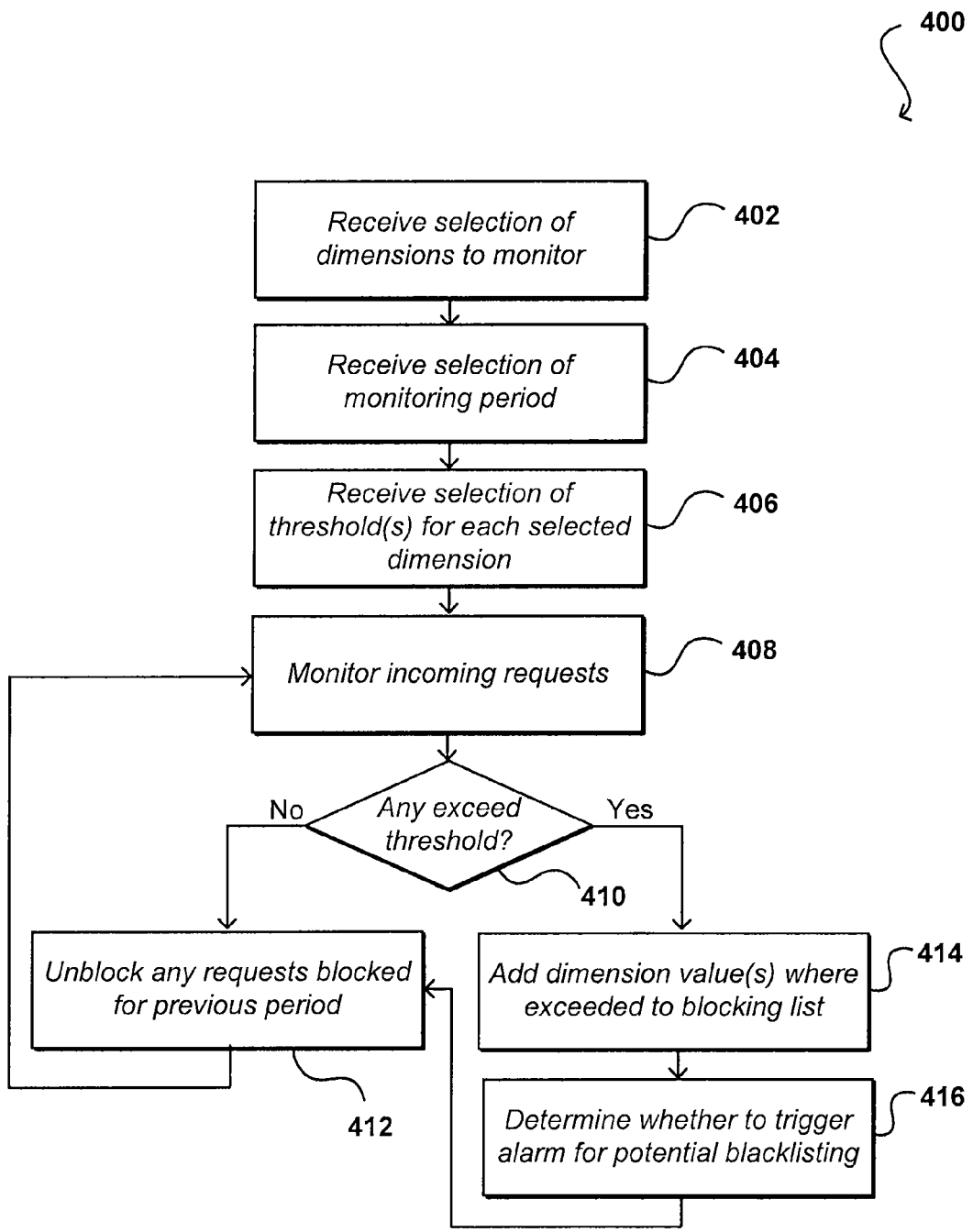
FIG. 4 illustrates steps of a process for dynamically blocking requests that can be used in accordance with one embodiment.

FIG. 4 illustrates steps of a method 400 for dynamically monitoring and blocking requests that can be used in accordance with one embodiment, using a configuration such as the one described above with respect to FIG. 2. In this example, an administrator or other authorized person or process selects at least one dimension to be monitored for incoming requests to each host device 402. As discussed above, appropriate dimensions can include originating IP address, session ID, user ID, and/or any other appropriate dimension that can be determined for a received request or other submission. An administrator or other authorized person or process also specifies or otherwise selects the length of a monitoring period to be used to dynamically monitor and/or block requests 404. As discussed above, an appropriate period such as two minutes can be specified that allows for sufficient data collection while substantially preventing damage due to excessive requests. This period can vary by system, environment, process, and other such dimensions, and can be determined before receiving requests and/or adjusted or set after a period of receiving requests and monitoring data. In some systems, an attack takes at least fifteen minutes to damage the system, such that other periods such as one, five, or ten minutes also can be appropriate in various embodiments. For each selected dimension, the administrator (or other authorized person or process) also specifies at least one threshold for the specified monitoring period 406. For example, if a request manager is directed to monitor requests by user ID and IP address, it might be desirable to set different thresholds for each dimension as there might be multiple users for a common IP address.

Once the appropriate dimensions and thresholds are set, the requests or submissions being received by each host can be monitored over these dimensions for each monitoring period 408. At or near the end of each monitoring period, a determination is made as to whether any set of requests having a common value for any of the specified dimensions exceeded the threshold for that dimension 410. For example, it can be determined whether more than two requests per second were received from the same originating IP address over the previous monitoring period, where two requests per second is the threshold set for the originating IP address dimension. If no thresholds were met or exceeded during that time period, then the process continues for the next monitoring period. If there were any dimensions values blocked for the previous monitoring period, then those values can be unblocked for the next monitoring period 412.

If, however, there were requests for at least one dimension where the requests with similar dimension values met or exceeded a threshold, and requests with that dimension value are not on a whitelist or otherwise allowed as discussed elsewhere herein, then each such dimension value can be added to a temporary block list 414, or otherwise designated to be blocked over the next monitoring period. As discussed herein, this can include storing the dimension values in memory for each host, or in any other appropriate location accessible to the host device or any related device useful for blocking the requests. Further, for any dimension value where the requests are determined to meet or exceed the respective threshold, a determination can be made as to whether that dimension value has been blocked with sufficient frequency, or according to any other appropriate specified criteria, that an alarm, message, or other appropriate indicator should be generated in order to consider that dimension value for blacklisting, or more permanent blocking 416. For example, if requests for a specific dimension value are blocked more than five times in an hour, then an alarm can be triggered that causes a person to review associated data and determine whether to blacklist the data. In other embodiments, the dimension value can be added to a report that will be reviewed by an authorized user, a message will be sent indicating the dimension value, or another such action will occur. In some embodiments, the dimension value can be automatically blacklisted, although for customer relations and other such reasons an automatic blacklisting feature can be undesirable in at least some embodiments. After the blocking and any blacklisting data is updated, and after any dimensions values blocked for the previous monitoring period are unblocked, the process can continue for the next monitoring period. It should be understood that the order of the various steps can vary in various embodiments, and that fewer, additional, or other steps can be used in various embodiments as discussed or suggested herein.

A monitoring process can include a monitoring script that executes once at or near the end of each monitoring period for each host. In some cases, a separate instance of the script can be executed for each organization, division, group, or other such division or entity handled by that host. For example, as illustrated in the table 500 of FIG. 5, there can be different thresholds, monitoring periods, and other such aspects specified for different organizations, in this example for different geographic divisions of an organization. Such a table can also vary between hosts, and a copy of such a table can be stored on or at least available to each host, or at least to each request manager determining whether to block requests. Further, as shown there can be different thresholds for the same dimensions. For example, one threshold might be set for the total number of requests received over a monitoring period, while another threshold might be set for a number of requests per second, etc.

For each host in one embodiment there is deployed a whitelist, a blacklist, and a threshold configuration. The whitelist as discussed herein indicates any dimension values for which requests should never be blocked, and the blacklist indicates any dimension values for which requests should always be blocked. The threshold configuration contains the information that should be used for each host to dynamically determine whether to block requests having specific dimensions values for that host. In some embodiments, the whitelist and blacklist will be the same across all hosts, and thus not every host has to maintain a copy.

A system in accordance with one embodiment also includes a monitoring process, either separate or as part of the request manager, that monitors the number of requests being blocked at any given time. The monitoring process can examine a query log or any other appropriate data store or information source to determine the number of blocked requests. In one embodiment, an administrator or other authorized user can set at least one threshold relating to the number of blocked requests. For example, this threshold might relate to the total number of blocked requests for any host, a total number of dimension values being blocked for any host, etc. If the number of blocked requests meets or exceeds one of these thresholds, an alarm or other notification can be generated accordingly. In response to the alarm, an administrator or other authorized user or process can analyze information about the blocking, and can determine whether there is a large scale attack over many dimensions or dimension values and can address the situation accordingly. A determination also can be made as to whether too many requests are being improperly blocked, such that blocking of at least some of the requests can be manually stopped, such as by adding a dimension value to a whitelist, for at least some period of time.

In a specific example of a system that can implement aspects of various embodiments, a provider might provide a Web site that is an interface to an electronic marketplace. As known in the art, an electronic marketplace generally allows potential customers to view items being offered for consumption though the site. As used herein, the term "item" can refer to anything that can be ordered, purchased, rented, used, or otherwise consumed and/or accessed via a network request or electronic submission, such as a product, service, or system. A request can include any appropriate request sent over an appropriate system or network, such as a request submitted to a Web page over the Internet or a message sent via a messaging system to a content provider, for example.

A customer wishing to purchase or otherwise consume an item from an electronic marketplace in one example can add the item to what is generally referred to as a virtual shopping cart, or other such data repository for items to be purchased or otherwise consumed, by submitting an appropriate request. Various other requests also can be submitted by a customer through interaction with the marketplace, such as to search for an item, browse various categories, etc. The electronic marketplace can include several hosts operable to receive such requests. When a host receives such a request, the request can be processed, and an entry can be written to a cart query log or other appropriate storage location for the host receiving the request. At the end of each monitoring period, at least one script can be executed against each cart query log to search or otherwise examine the data over the most recent monitoring period (although in some embodiments additional thresholds can be set for multiple monitoring periods). In this example, each script attempts to determine at least one list of requests with the same originating IP address, session information, or customer information that exceed either a total request threshold for that period, or a requests per second threshold over that period. This can involve first generating a list of requests with similar information and then applying the thresholds to the top sets of information on each list.

In this example, the threshold configuration is retrieved for each respective host. For each item in each list, the item can be added to a list of dimensions values to be blocked for the next monitoring period if the item does not appear in an appropriate whitelist, the item does not appear in an appropriate blacklist (as the item would already be blocked so there is no need to block the item again), and the item meets or exceeds the relevant threshold for that dimension. A new cart configuration can be created for the next monitoring period that will include a list of dimension values (i.e., potential bots) to be blocked. This list can contain all items on the blacklist and the current blocking list for the current monitoring period, but no items on the whitelist. Other lists will contain all items on the whitelist with a different value associated therewith indicating that there is no need to block such requests. For each entry in the current list, a bot monitoring query log entry can be written matching the requirements of that entry. The information in the bot monitoring query log can be used to track blocking over time, such as may be useful to determine whether to add a dimension value to the blacklist.

Such an approach can also track other information or dimension values, such as destination IPs, items, display pages, URLs, or anything that might have an excessive number of requests directed thereto or associated therewith. A selection of origination IP, session ID, and customer ID can make sense in certain situations as such information can be relatively simple to track and can to take care of most such attacks. It should be understood, however, that a blocking script or monitoring process can look at any data or metadata put into or related to each request, and can set or apply a threshold over that dimension.

One advantage of various approaches set forth herein is that blocking decisions can be made at practically any host level. On average, based on the amount of volume of traffic, each host can decide which requests to block, and can have a specific threshold set that is applicable for that host at that level in the system. Further, such a blocking process is a dynamic process, with blocking decisions being revisited every few minutes according to the configurable monitoring period. Each host only looks to hits on that particular host, not on other hosts, such that the logic is isolated on every host. A benefit of host-specific blocking is that decisions can be made very quickly, and there is no need to have a resource-intensive centralized system that cannot make rapid blocking decisions for a number of organizations on a number of hosts for a large number of dimensions values. In order to prevent flooding of a host with requests, it can be desirable to make blocking decisions in a relatively quick manner. Not having to centralize information and/or aggregate a lot of information and make a difficult, calculated decision, then re-distribute such a decision to each host in order to perform blocking, can be advantageous in many situations. Such an approach also allows such security measures to easily be implemented on any host across an enterprise, fleet, etc., wherever such functionality is desired.

A request monitoring system also can be configured to generate any of a number of different reports relating to the blocking of requests. In one embodiment, a report is generated and published every few minutes such that blockages over time, total blockages, percent blockages, and other such information can be tracked over time, and so that current information about requests being actively blocked is available. Such reports can be useful to adjust various thresholds or other aspects if too many requests are being blocked, certain requests are being blocked that should not be blocked, etc., such that the blocking of requests can be adjusted as system parameters change. For example, if part of the fleet goes down such that a fewer number of hosts are handling all the requests, then it might be desirable to adjust the thresholds as more requests are being directed to each individual host and it can be easier for a legitimate user to accidentally reach a threshold. In one embodiment, thresholds are always calculated and/or adjusted based on the number of hosts available. Reports also can help to determine which customers or sessions were blocked the most over a given period of time, etc., in case certain customers need to be charged more (or less if regularly blocked) for the specific usage, etc. Such reports also can allow for drilling down to very specific levels of detail. Reports also can allow for viewing and/or graphing different dimensions over various periods of time.

In some embodiments, a page is provided that allows each user of the system to access the page and enter information such as an IP address, session ID, customer ID, username, etc., and get a status of their current state (e.g., blocked, unblocked, blacklisted, whitelisted, etc.). A user also can be provided with a history of any blockages, as well as a time when a blocked user can expect to be unblocked, etc. The user also can be allowed to drill into more detail for any history item. For example, if a user is presented with a list of "blockages", each item in the list can correspond to a hyperlink or other element that allows the user to see information indicating why the user was blocked at that time, such as a snapshot of the relevant query logs that match the period in question for the entered information.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a langauge such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of dynamically blocking requests at any of a plurality of hosts for an entity, comprising:
   determining configuration information for each of the plurality of hosts, the configuration information including a monitoring period length, at least one dimension to be monitored for each host, and at least one threshold for each determined dimension;
   receiving a plurality of requests to the entity over a first monitoring period, each of the requests being directed for one of the hosts for the entity, more than one of the requests being directed for at least one of the hosts for the entity, each host operable to process any of the plurality of requests;
   for each host, determining whether any subset of the received electronic requests includes a number of requests that at least meets the threshold for a determined dimension for the host, each received electronic request in the subset having a common value for the determined dimension;
   for any subset determined to at least meet the threshold for the determined dimension, blocking requests having the common value for the determined dimension over a second monitoring period for the respective host; and
   generating, for at least one blocked request, a response indicating the at least one threshold for each determined dimension that has been exceeded,
   wherein requests having the common value for the determined dimension are able to be processed on at least one other host for the entity during the second monitoring period unless requests having the common value are also blocked on that at least one other host.

2. A computer-implemented method according to claim 1, further comprising:
   automatically unblocking the blocked requests for a third monitoring period if the subset does not at least meet the threshold for the determined dimension over the second monitoring period.

3. A computer-implemented method according to claim 1, further comprising:
   enabling an authorized user to adjust the configuration information for each of the plurality of hosts.

4. A method of dynamically blocking electronic submissions, comprising:
   receiving a plurality of electronic submissions over a first monitoring period to an entity providing a plurality of hosts, each of the plurality of hosts operable to process any of the electronic submissions;
   identifying configuration information for each of the plurality of hosts, the configuration information including a monitoring period length, at least one dimension to be monitored, and at least one threshold corresponding to the at least one dimension to be monitored;
   determining whether any subset of the received electronic submissions includes a number of submissions that at least meets a specified threshold for a determined dimension relating to the electronic submissions, each received electronic submission in a subset having a common value for the determined dimension;
   for any subset determined to at least meet the specified threshold for the determined dimension, blocking submissions having the common value for the determined dimension from being processed on a respective host for the subset over a second monitoring period, submissions from other subsets having the common value for the determined dimension capable of being processed by another host during the second monitoring period; and
   generating, for at least one blocked submission, a response indicating the specified threshold for the determined dimension that has been exceeded.

5. A method according to claim 4, further comprising:
   automatically unblocking each blocked submission for a subsequent monitoring period if the subset does not at least meet the threshold for the determined dimension over the second monitoring period.

6. A method according to claim 4, further comprising:
   maintaining a whitelist of dimension values for which submissions will not be blocked.

7. A method according to claim 4, further comprising:
   maintaining a static blacklist of dimension values for which submissions will automatically be blocked.

8. A method according to claim 7, further comprising:
   triggering an alert when submissions having a common parameter value are blocked for a specified number of monitoring periods,
   wherein a user is able to determine whether to add the common parameter value to the blacklist.

9. A method according to claim 4, further comprising:
   generating for display, in response to a blocked submission, a page indicating that the blocked submission is not being processed.

10. A method according to claim 4, wherein:
    the determined dimension includes at least one of originating address, session information, and user information.

11. A method according to claim 4, wherein:
    the specified threshold for each determined dimension is one of a maximum allowed number of requests for each monitoring period and a maximum allowed rate of requests.

12. A method according to claim 4, further comprising:
setting different thresholds for subsets of received submissions having the common value for the determined dimension, but having at least one different aspect between the subsets.

13. A method according to claim 4, further comprising:
generating reports including information for the blocked submissions after each monitoring period.

14. A method according to claim 4, further comprising:
writing, to a query log for each host, information for each submission received by that host over one of the first and second monitoring periods.

15. A method according to claim 4, further comprising:
writing, to a bot monitoring log, information for relating to any blocked requests.

16. A system for dynamically blocking electronic submissions, comprising:
a processor; and
a memory device including instructions that, when executed by the processor, cause the processor to:
receive a plurality of electronic submissions over a first monitoring period to an entity providing a plurality of hosts, each of the plurality of hosts operable to process any of the electronic submissions;
determine whether any subset of the received electronic submissions includes a number of submissions that at least meets a specified threshold for a determined dimension relating to the electronic submissions, each received electronic submission in a subset having a common value for the determined dimension;
for any subset determined to at least meet the specified threshold for the determined dimension, block submissions having the common value for the determined dimension from being processed on a respective host for the subset over a second monitoring period, submissions from other subsets having the common value for the determined dimension capable of being processed by another host during the second monitoring period; and
generating, for at least one blocked request, a response indicating the at least one threshold for each determined dimension that has been exceeded.

17. A system according to claim 16, wherein the instructions, when executed by the processor, further cause the processor to:
automatically unblock each blocked submission for a subsequent monitoring period if the subset does not at least meet the threshold for the determined dimension over the second monitoring period.

18. A system according to claim 16, wherein the instructions, when executed by the processor, further cause the processor to:
trigger an alert when submissions having a common parameter value are blocked for a specified number of monitoring periods,
wherein a user is able to determine whether to add the common parameter value to the blacklist.

19. A system for dynamically blocking requests at any of a plurality of hosts for an entity, comprising:
a processor; and
a memory device including instructions that, when executed by the processor, cause the processor to:
determine configuration information for each of the plurality of hosts, the configuration information including a monitoring period length, at least one dimension to be monitored for each host, and at least one threshold for each determined dimension;
receive a plurality of requests to the entity over a first monitoring period, each of the requests being directed to one of the hosts for the entity, each host operable to process any of the plurality of requests;
for each host, determine whether any subset of the received electronic requests includes a number of requests that at least meets the threshold for a determined dimension for the host, each received electronic request in the subset having a common value for the determined dimension; and
for any subset determined to at least meet the threshold for the determined dimension, block requests having the common value for the determined dimension over a second monitoring period for the respective host; and
generating, for at least one blocked request, a response indicating the at least one threshold for each determined dimension that has been exceeded,
wherein requests having the common value for the determined dimension are able to be processed on at least one other host for the entity during the second monitoring period unless requests having the common value are also blocked on that other host.

20. A system according to claim 19, wherein the instructions, when executed by the processor, further cause the processor to:
automatically unblocking the blocked requests for a third monitoring period if the subset does not at least meet the threshold for the determined dimension over the second monitoring period.

21. A computer program product embedded in a non-transitory computer-readable medium including processor-executable instructions for dynamically blocking electronic submissions, comprising:
program code for receiving a plurality of electronic submissions over a first monitoring period to an entity providing a plurality of hosts, each of the plurality of hosts operable to process any of the electronic submissions;
program code for determining configuration information for each of the plurality of hosts, the configuration information including a monitoring period length, at least one dimension to be monitored for each host, and at least one threshold for each determined dimension;
program code for determining whether any subset of the received electronic submissions includes a number of submissions that at least meets a specified threshold for a determined dimension relating to the electronic submissions, each received electronic submission in a subset having a common value for the determined dimension;
program code for, for any subset determined to at least meet the specified threshold for the determined dimension, blocking submissions having the common value for the determined dimension from being processed on a respective host for the subset over a second monitoring period, submissions from other subsets having the common value for the determined dimension capable of being processed by another host during the second monitoring period; and
program code for, for at least one blocked submission, generating a response indicating the specified threshold for the determined dimension that has been exceeded.

22. A method according to claim 4, further comprising sending the generated response to a device generating the blocked submission for display, including an option to resubmit the blocked submission after a specified period of time has passed.

23. A method according to claim 14, further comprising sending the generated response to a device generating the blocked submission for display, including the query log for each host.

24. A method according to claim 23 further comprising:
- determining whether the blocked submission was improperly blocked based at least in part on information associated with the blocked submission in the generated response; and
- adding an additional dimension value to a whitelist of dimension values for which submissions will not be blocked.

25. A method according to claim 24, further comprising manually stopping blocking of at least one of the blocked submissions for at least a temporary period of time.

* * * * *

UNITED STATES PATENT AND TRADEMARK OFFICE
CERTIFICATE OF CORRECTION

| | |
|---|---|
| PATENT NO. | : 8,621,065 B1 |
| APPLICATION NO. | : 12/257112 |
| DATED | : December 31, 2013 |
| INVENTOR(S) | : Pierre Saurel et al. |

It is certified that error appears in the above-identified patent and that said Letters Patent is hereby corrected as shown below:

In the Claims

Column 13, line 34-Column 17, line 15, delete claims 1-25 and substitute therefore with the following claims 1-25.

1.    A computer-implemented method of dynamically blocking requests at any of a plurality of hosts for an entity, comprising:

determining configuration information for each of the plurality of hosts, the configuration information including a monitoring period length, at least one dimension to be monitored for each host, and at least one threshold for each determined dimension;

receiving a plurality of requests to the entity over a first monitoring period, each of the requests being directed for one of the hosts for the entity, more than one of the requests being directed for at least one of the hosts for the entity, each host operable to process any of the plurality of requests;

for each host, determining whether any subset of the received electronic requests includes a number of requests that at least meets the threshold for a determined dimension for the host, each received electronic request in the subset having a common value for the determined dimension;

for any subset determined to at least meet the threshold for the determined dimension, blocking requests having the common value for the determined dimension over a second monitoring period for the respective host; and generating, for at least one blocked request, a response indicating the at least one threshold for each determined dimension that has been exceeded, Signed and Sealed this
Twenty-second Day of July, 2014

Michelle K. Lee
*Deputy Director of the United States Patent and Trademark Office* wherein requests having the common value for the determined dimension are able to be processed on at least one other host for the entity during the second monitoring period unless requests having the common value are also blocked on that at least one other host.

2. A computer-implemented method according to claim 1, further comprising:
automatically unblocking the blocked requests for a third monitoring period if the subset does not at least meet the threshold for the determined dimension over the second monitoring period.

3. A computer-implemented method according to claim 1, further comprising:
enabling an authorized user to adjust the configuration information for each of the plurality of hosts.

4. A method of dynamically blocking electronic submissions, comprising:
receiving a plurality of electronic submissions over a first monitoring period to an entity providing a plurality of hosts, each of the plurality of hosts operable to process any of the electronic submissions;
identifying configuration information for each of the plurality of hosts, the configuration information including a monitoring period length, at least one dimension to be monitored, and at least one threshold corresponding to the at least one dimension to be monitored;
determining whether any subset of the received electronic submissions includes a number of submissions that at least meets a specified threshold for a determined dimension relating to the electronic submissions, each received electronic submission in a subset having a common value for the determined dimension;
for any subset determined to at least meet the specified threshold for the determined dimension, blocking submissions having the common value for the determined dimension from being processed on a respective host for the subset over a second monitoring period, submissions from other subsets having the common value for the determined dimension capable of being processed by another host during the second monitoring period; and
generating, for at least one blocked submission, a response indicating the specified threshold for the determined dimension that has been exceeded.

5. A method according to claim 4, further comprising:

automatically unblocking each blocked submission for a subsequent monitoring period if the subset does not at least meet the threshold for the determined dimension over the second monitoring period.

6. A method according to claim 4, further comprising:

maintaining a whitelist of dimension values for which submissions will not be blocked.

7. A method according to claim 4, further comprising:

maintaining a static blacklist of dimension values for which submissions will automatically be blocked.

8. A method according to claim 7, further comprising:

triggering an alert when submissions having a common parameter value are blocked for a specified number of monitoring periods, wherein a user is able to determine whether to add the common parameter value to the blacklist.

9. A method according to claim 4, further comprising:

generating for display, in response to a blocked submission, a page indicating that the blocked submission is not being processed.

10. A method according to claim 4, wherein:

the determined dimension includes at least one of originating address, session information, and user information.

11. A method according to claim 4, wherein:

the specified threshold for each determined dimension is one of a maximum allowed number of requests for each monitoring period and a maximum allowed rate of requests.

12. A method according to claim 4, further comprising:

setting different thresholds for subsets of received submissions having the common value for the determined dimension, but having at least one different aspect between the subsets.

13. A method according to claim 4, further comprising:

generating reports including information for the blocked submissions after each monitoring period.

14. A method according to claim 4, further comprising:

writing, to a query log for each host, information for each submission received by that host over one of the first and second monitoring periods.

15. A method according to claim 14, further comprising sending the generated response to a device generating the blocked submission for display, including the query log for each host.

16. A method according to claim 15 further comprising:

determining whether the blocked submission was improperly blocked based at least in part on information associated with the blocked submission in the generated response; and adding an additional dimension value to a whitelist of dimension values for which submissions will not be blocked.

17. A method according to claim 16, further comprising manually stopping blocking of at least one of the blocked submissions for at least a temporary period of time.

18. A method according to claim 4, further comprising:

writing, to a bot monitoring log, information for relating to any blocked requests.

19. A method according to claim 4, further comprising sending the generated response to a device generating the blocked submission for display, including an option to resubmit the blocked submission after a specified period of time has passed.

20. A system for dynamically blocking electronic submissions, comprising:

a processor; and a memory device including instructions that, when executed by the processor, cause the processor to:

receive a plurality of electronic submissions over a first monitoring period to an entity providing a plurality of hosts, each of the plurality of hosts operable to process any of the electronic submissions;

determine whether any subset of the received electronic submissions includes a number of submissions that at least meets a specified threshold for a determined dimension relating to the electronic submissions, each received electronic submission in a subset having a common value for the determined dimension;

for any subset determined to at least meet the specified threshold for the determined dimension, block submissions having the common value for the determined dimension from being processed on a respective host for the subset over a second monitoring period, submissions from other subsets having the common value for the determined dimension capable of being processed by another host during the second monitoring period; and generating, for at least one blocked request, a response indicating the at least one threshold for each determined dimension that has been exceeded.

21. A system according to claim 20, wherein the instructions, when executed by the processor, further cause the processor to:

automatically unblock each blocked submission for a subsequent monitoring period if the subset does not at least meet the threshold for the determined dimension over the second monitoring period.

22. A system according to claim 20, wherein the instructions, when executed by the processor, further cause the processor to:

trigger an alert when submissions having a common parameter value are blocked for a specified number of monitoring periods, wherein a user is able to determine whether to add the common parameter value to the blacklist.

23. A system for dynamically blocking requests at any of a plurality of hosts for an entity, comprising:

a processor; and a memory device including instructions that, when executed by the processor, cause the processor to:

determine configuration information for each of the plurality of hosts, the configuration information including a monitoring period length, at least one dimension to be monitored for each host, and at least one threshold for each determined dimension;

receive a plurality of requests to the entity over a first monitoring period, each of the requests being directed to one of the hosts for the entity, each host operable to process any of the plurality of requests;

for each host, determine whether any subset of the received electronic requests includes a number of requests that at least meets the threshold for a determined dimension for the host, each received electronic request in the subset having a common value for the determined dimension; and for any subset determined to at least meet the threshold for the determined dimension, block requests having the common value for the determined dimension over a second monitoring period for the respective host; and generating, for at least one blocked request, a response indicating the at least one threshold for each determined dimension that has been exceeded, wherein requests having the common value for the determined dimension are able to be processed on at least one other host for the entity during the second monitoring period unless requests having the common value are also blocked on that other host.

24. A system according to claim 23, wherein the instructions, when executed by the processor, further cause the processor to:

automatically unblocking the blocked requests for a third monitoring period if the subset does not at least meet the threshold for the determined dimension over the second monitoring period.

25. A computer program product embedded in a non-transitory computer-readable medium including processor-executable instructions for dynamically blocking electronic submissions, comprising:

program code for receiving a plurality of electronic submissions over a first monitoring period to an entity providing a plurality of hosts, each of the plurality of hosts operable to process any of the electronic submissions;

program code for determining configuration information for each of the plurality of hosts, the configuration information including a monitoring period length, at least one dimension to be monitored for each host, and at least one threshold for each determined dimension;

program code for determining whether any subset of the received electronic submissions includes a number of submissions that at least meets a specified threshold for a determined dimension relating to the electronic submissions, each received electronic submission in a subset having a common value for the determined dimension;

program code for, for any subset determined to at least meet the specified threshold for the determined dimension, blocking submissions having the common value for the determined dimension from being processed on a respective host for the subset over a second monitoring period, submissions from other subsets having the common value for the determined dimension capable of being processed by another host during the second monitoring period; and program code for, for at least one blocked submission, generating a response indicating the specified threshold for the determined dimension that has been exceeded.